T. SALARI.
AIRCRAFT LIFE BOAT.
APPLICATION FILED OCT. 22, 1917.

1,281,846.

Patented Oct. 15, 1918.

INVENTOR:
TONY SALARI

UNITED STATES PATENT OFFICE.

TONY SALARI, OF BISBEE, ARIZONA.

AIRCRAFT LIFE-BOAT.

1,281,846.   Specification of Letters Patent.   Patented Oct. 15, 1918.

Application filed October 22, 1917.   Serial No. 197,924.

*To all whom it may concern:*

Be it known that I, TONY SALARI, a citizen of the United States, and resident of Bisbee, Cochise county, Arizona, have invented a new and useful Aircraft Life-Boat, of which the following is a specification.

The object of this invention is to provide an improved safety receptacle or housing adapted for occupancy by operators or passengers of aircraft for the purpose of cushioning falls.

A further object of this invention is to provide improved means for adding to the safety of air navigation by providing a cushioned housing or receptacle for the operators or passengers of aircraft.

A further object of this invention is to provide improved means for cushioning an inner shell relative to an outer shell.

A further object of this invention is to provide improved projecting yielding pressure devices on the outer shell of an aircraft housing.

My invention consists in the construction, arrangement and combination of elements hereinafter set forth, pointed out in my claims and illustrated by the accompanying drawing, in which—

Figure 1:
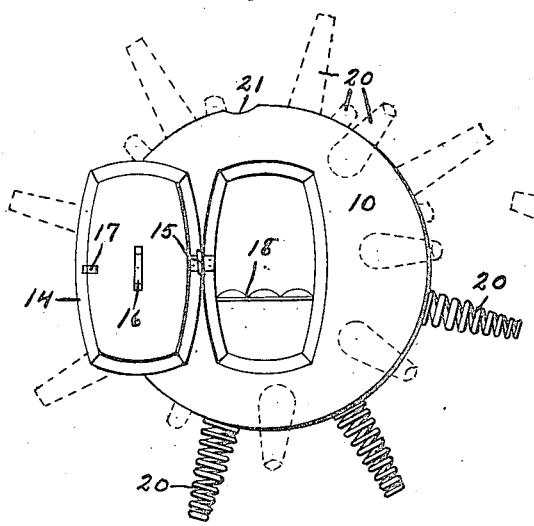
Figure 2:
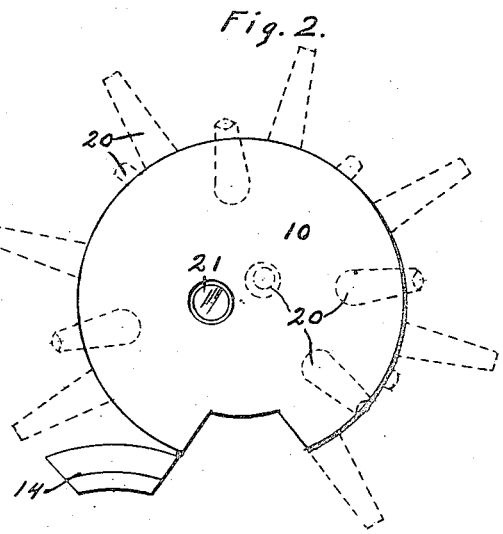
Figure 3:
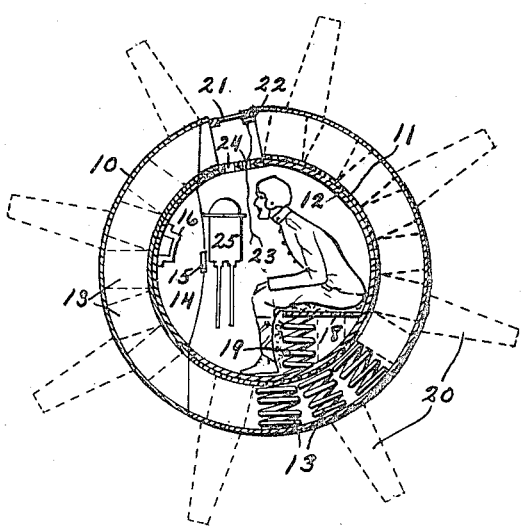

Figure 1 is an elevation of my improved device, showing the door in open position. Fig. 2 is an elevation substantially at right angles to Fig. 1. Fig. 3 is a vertical section of the device, the door being closed.

In the construction of the device as shown the numeral 10 designates generally an exterior wall or shell which may be of any suitable size and shape and constructed of any suitable material, such as sheet steel, or of rubber, rubber and fabric, or any other suitable rigid, flexible, or elastic material or a combination of one or more of such materials. The shell 10 preferably is spherical in form or nearly so. An inner wall 11 is mounted within and spaced from the exterior wall or shell 10, and said inner wall also may be formed of any suitable material, preferably being lined with a padded or cushioning material indicated by the numeral 12. The inner wall 11 is of a size to accommodate one or more persons therein in sitting posture. A plurality of coil springs 13, in any desired number, are mounted between the inner and outer walls and suspend and support the inner wall relative to the outer wall in a yielding manner, said springs preferably being of sufficient strength to support the inner wall and its load normally in approximately concentric relation to the shell. A door 14 is provided and may be composed of connected sections of both the shell 10 and inner compartment or wall 11, and said door conforms to the curvature of the outer shell and is pivoted thereto by hinging means 15, and is adapted to close tightly the ingress and egress opening formed in said members. A handle 16 preferably is provided on the inner surface of the door 14, and a latch 17 for holding it in closed position. A seat 18 is provided within the inner wall 11, preferably upholstered, and said seat is arranged opposite to the door 14. Springs 19 may also be provided in the supports for the seat 18. A plurality of spirally coiled springs 20 are fixed to and project radially from the outer surface of the exterior shell 10 in suitably spaced relations.

It is the function of the projecting springs 20 to take the first shock of contact in case the device falls to the ground, and to break the fall, while the interior wall is cushioned by the springs 13 within the outer shell and further cushions the fall and protects the occupants of the device. Further protection is provided by the padded lining 12.

In use the device preferably is mounted on an air craft in lieu of the seat commonly provided, and the operator and passenger, if any, take their seats within the device; or separate life-saving devices may be provided for each of the fliers. The device may, however, be located in any desired or suitable position on the aircraft. The door 14 normally remains open to permit the operator or observer to have vision externally of the device, but in case of a threatened fall the door may be quickly pulled to closed position by the handle 16 or a draft device attached thereto. The device constructed as shown and described will resist a very great shock and provide against injury of a considerable fall, through the cushioning devices shown and described. A glazed window 21 preferably is provided in the outer wall or shell 10 and normally held in closed position by a latching device 22 shown conventionally. A draft cord 23 may be secured to the latch 22 and depend through one of a number of apertures 24 in the inner wall and lining, to within reach of the occupant, through which the latch may be released to permit opening of the window 21. It is the function of the window to admit light to the device and to admit air thereto after a fall, the door having been closed during or prior to the fall.

An air or oxygen tank 25 may be suspended within the device to supply air to the occupants when the door is closed.

I claim as my invention—

1. An aircraft life-boat, comprising an outer shell, yielding pressure devices on the outer surface thereof, an inner wall mounted within and spaced from said shell, cushioning springs interposed between said shell and inner wall, said shell and inner wall being formed with registering openings, a hinged door for closing said openings, and a window in said outer shell and communicating with the interior of said inner wall, together with means for opening said window from the interior of the inner wall.

2. An aircraft life-boat, comprising an outer shell, yielding pressure devices on the outer surface thereof, an inner wall mounted within and spaced from said shell, cushioning springs interposed between said shell and inner wall, said shell and inner wall being formed with registering openings, a hinged door for closing said openings, and an air tank within said inner wall for use when said door is closed.

TONY SALARI.